8895X
J. H. Darby,
Mortising Machine.
Patented June 15, 1835.
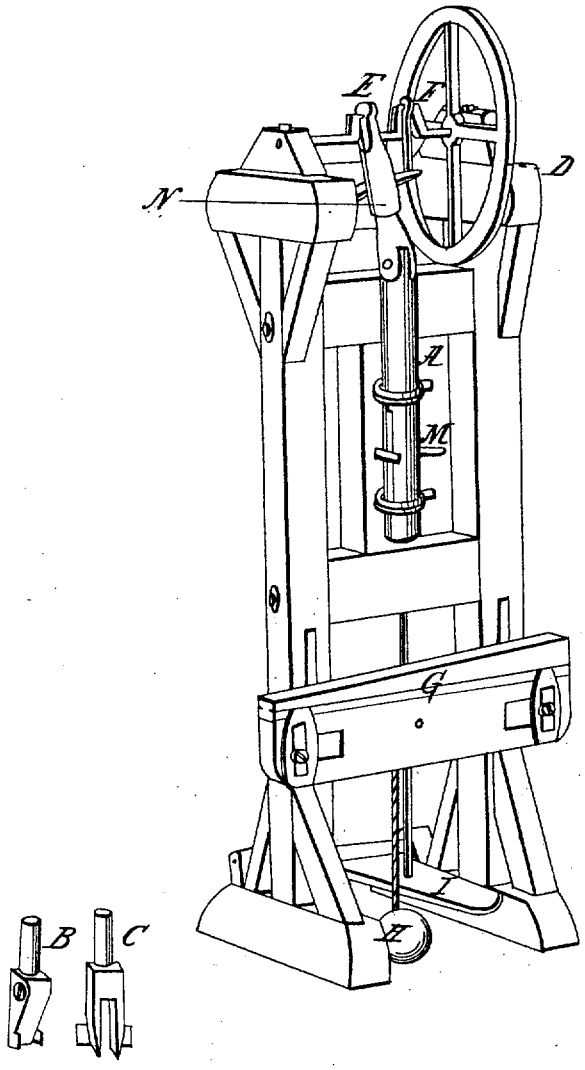
AM. PHOTO-LITHO. CO. N.Y. (OSBORNE'S PROCESS)

8895X

June 15. 1835

Joseph H. Darby of Leominster, Massachusetts

Letters Patent

To all to whom these presents shall come.
Be it known that I Joseph H. Darby of Leominster in the County of Worcester and State of Massachusetts have invented a new and useful mortising and tenon machine and that the following is a full and exact description thereof viz. it consists of a frame, the bottom of which and also the top are four feet long, and is eighteen inches wide and six feet and four inches high, It has a balance wheel three feet in diameter, in the shaft upon which the balance wheel turns there are two cranks one used to put the side wheel in motion by means of a treadle to the other crank is attached a spindle in which is a swivel so that said spindle may be turned round, at the bottom of said spindle is inserted the chisels which form the mortises or tenons, This spindle has a joint and the lower part thereof moves directly up and down when the wheel is in motion by means of passing through two clasps fastened to a permanent part of said frame The swivel aforesaid is inserted for the purpose of turning the chisels or facing them either way which will be necessary to complete each mortise, The platform upon which the timber rests to be mortised &c is attached to the frame by means of screws, and may be raised or lowered to suit the size of the timber The top of this platform is a slide made in the form of a wedge to which is attached a three pound weight so that when the machine is in motion the weight draws out said slide gradually, thus raising the timber and thereby increasing the feed of the chisel — The depth of the mortise may be limited by means of a strap fastened to the other end of said slide, and the length of this strap will govern the length of the mortise, The chisels may be increased or diminished in width 154 8895 X by means of screwing on or off upon the side additional chains
A model of the above described machine is herewith submitted
April 21st 1835, Witnesses
Gilbert Desby
Nath^l Wood Joseph H Darby Copied (Drawing)

(408 words)

(Patented June 15. 1835.)